(12) United States Patent
Ashek et al.

(10) Patent No.: US 11,270,105 B2
(45) Date of Patent: Mar. 8, 2022

(54) EXTRACTING AND ANALYZING INFORMATION FROM ENGINEERING DRAWINGS

(71) Applicant: International Business Machines Corporation, Armonk, NY (US)

(72) Inventors: Mahmood Saajan Ashek, Markham (CA); Raghu Kiran Ganti, White Plains, NY (US); Shreeranjani Srirangamsridharan, White Plains, NY (US); Mudhakar Srivatsa, White Plains, NY (US); Asif Sharif, Milton (CA); Ramey Ghabros, Toronto (CA); Somesh Jha, Toronto (CA); Mojdeh Sayari Nejad, North York (CA); Mohammad Siddiqui, Toronto (CA); Yusuf Mai, Richmond Hill (CA)

(73) Assignee: International Business Machines Corporation, Armonk, NY (US)

(*) Notice: Subject to any disclaimer, the term of this patent is extended or adjusted under 35 U.S.C. 154(b) by 192 days.

(21) Appl. No.: 16/580,229

(22) Filed: Sep. 24, 2019

(65) Prior Publication Data
US 2021/0089767 A1 Mar. 25, 2021

(51) Int. Cl.
*G06K 9/00* (2006.01)
*G06N 3/04* (2006.01)
(Continued)

(52) U.S. Cl.
CPC ..... *G06K 9/00476* (2013.01); *G06K 9/00456* (2013.01); *G06K 9/00463* (2013.01);
(Continued)

(58) Field of Classification Search
CPC ........... G06K 9/00456; G06K 9/00463; G06K 9/00476; G06K 9/03; G06K 9/4604;
(Continued)

(56) References Cited

U.S. PATENT DOCUMENTS 5,887,078 A * 3/1999 Kwon .................. G06K 9/4628
382/156
9,003,240 B2 4/2015 Rhee et al.
(Continued)

FOREIGN PATENT DOCUMENTS

CN 102880868 A 1/2013

OTHER PUBLICATIONS

Gherega, et al. (A Q-Learning Approach to Decision Problems in Image Processing), pp. 60-66. (Year: 2012).*
(Continued)

*Primary Examiner* — Daniel G Mariam
(74) *Attorney, Agent, or Firm* — Kelsey M. Skodje (57) ABSTRACT

A method and system for extracting information from a drawing. The method includes classifying nodes in the drawing, extracting attributes from the nodes, determining whether there are errors in the node attributes, and removing the nodes from the drawing. The method also includes identifying edges in the drawing, extracting attributes from the edges, and determining whether there are errors in the edge attributes. The system includes at least one processing component, at least one memory component, an identification component, an extraction component, and a correction component. The identification component is configured to classify nodes in the drawing, remove the nodes from the drawing, and identify edges in the drawing. The extraction component is configured to extract attributes from the nodes and edges. The correction component is configured to determine whether there are errors in the extracted attributes.

20 Claims, 5 Drawing Sheets

(51) Int. Cl.
*G06N 3/08* (2006.01)
*G06K 9/46* (2006.01)
*G06K 9/03* (2006.01)
*G06T 7/13* (2017.01)

(52) U.S. Cl.
CPC .............. *G06K 9/03* (2013.01); *G06K 9/4604* (2013.01); *G06N 3/04* (2013.01); *G06N 3/08* (2013.01); *G06T 7/13* (2017.01); *G06K 2209/01* (2013.01)

(58) Field of Classification Search
CPC .... G06K 2209/01; G06F 21/577; G06N 3/04; G06N 3/08
USPC .......................................... 382/113, 159, 224
See application file for complete search history.

(56) References Cited

U.S. PATENT DOCUMENTS 10,860,295 B1* 12/2020 Ketireddy ................. G06F 8/34
2017/0169291 A1 6/2017 Held et al.
2019/0080164 A1* 3/2019 Duke ................. G06K 9/00456

OTHER PUBLICATIONS

Motoi, et al. (Computer English Translation of Japanese Patent No. JP2011-90377A), pp. 1-15. (Year: 2011).*

Ageenko, E., "Context-Based Compression of Binary Images," Academic Dissertation, 2000, 120 pages, University of Joensuu.

Anonymous, "Recognizing Semantic Formatting Information in a Document," An IP.com Prior Art Database Technical Disclosure, IP.com No. IPCOM000251990D, Dec. 13, 2017, 35 pages. https://ip.com/IPCOM/000251990.

Cassata et al., "Practical Implementation of Engineering Design Integration Technology,"An IP.com Prior Art Database Technical Disclosure, IP.com No. IPCOM000217234D, Electronic Publication: May 4, 2012, 4 pages. KBR (Kellogg Brown & Root, LLC) 2011. https://ip.com/IPCOM/000217234.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

EXTRACTING AND ANALYZING INFORMATION FROM ENGINEERING DRAWINGS

This invention was made with U.S. Government support under W911NF-16-3-0001 awarded by Army Research Office (ARO). The U.S. Government has certain rights to this invention.

BACKGROUND

The present disclosure relates to information extraction and, more specifically, to information extraction from engineering drawings.

An engineering drawing is a type of technical drawing that define requirements (e.g., structural, dimensional, compositional, and other requirements) for an engineered item. Engineering drawings can also define processes. Examples of engineering drawings can include printed circuit board (PCB) fabrication drawings, architectural drawings, wiring diagrams, etc. Engineering drawings include nodes connected by edges (e.g. lines and/or arrows). The nodes and edges can be annotated. For example, a node can be a symbol representing a voltage source in a wiring diagram, and can be annotated with a voltage value. In another example, an edge can represent an electrical cable, and can be annotated with a length measurement.

SUMMARY

Various embodiments are directed to a system, which includes at least one processing component, at least one memory component, an identification component, an extraction component, and a correction component. The system can also include an attribute database, which can store definitions of node symbols and domain information. The identification component is configured to classify nodes in a drawing, remove the nodes from the drawing, and identify edges in the drawing. The node classification can be carried out via region-based convolutional neural networks (R-CNN), and can be rotation- and scale-invariant. The extraction component is configured to extract attributes (e.g., text annotations) from the nodes and edges. The correction component is configured to determine whether there are errors in the extracted attributes.

Further embodiments are directed to a method that includes classifying nodes in a drawing, and extracting attributes from the nodes. The node classification can be carried out using an R-CNN, and can be scale-invariant. The method also includes determining whether there are errors in the extracted node attributes, and removing the nodes from the drawing. Further, the method includes identifying edges in the drawing, extracting attributes from the edges, and determining whether there are errors in the extracted edge attributes. Identifying the edges can include carrying out edge detecting and reinforcement learning operators. Extracting the attributes from the nodes and edges can include comparing the extracted attributes to information in an attribute database, which can include data from a set of published standards. Determining whether there are errors in the node and edge attributes can be based on domain information.

Additional embodiments are directed to a computer program product for extracting information from a drawing. The computer program product includes a computer readable storage medium having program instructions, which are executable by a processor to cause a device to perform a method that includes classifying nodes in a drawing, and extracting attributes from the nodes. The node classification can be carried out using an R-CNN. The method also includes determining whether there are errors in the extracted node attributes, and removing the nodes from the drawing. Further, the method includes identifying edges in the drawing, extracting attributes from the edges, and determining whether there are errors in the extracted edge attributes. Identifying the edges can include carrying out edge detecting and reinforcement learning operators. Determining whether there are errors in the node and edge attributes can be based on domain information stored in an attribute database.

DETAILED DESCRIPTION

Engineering drawings are a type of technical drawing having nodes and edges. The nodes represent entities (e.g., components, locations, process steps, etc.), and the edges represent connections between these entities. Engineering drawings can define requirements (e.g., structural, dimensional, compositional, etc.) for engineered items (e.g., mechanical devices, circuits, etc.), structures and/or locations (e.g., buildings, maps, etc.), and process flows (e.g., chemical processes, project management plans, etc.). Examples of engineering drawings can include building, construction, electrical, and distribution networks; printed circuit board (PCB) fabrication drawings; architectural drawings; mechanical, electrical, and plumbing (MEP) drawings; etc.

Significant manual effort and time go into reading engineering drawings in order to map the drawings to bills of materials, generate cost estimates, check similarities with past plans (e.g., for estimations of risk or other problems that could arise), etc. The effort and time can be reduced by techniques for automatically extracting semantic information from the drawings. This information extraction can include identifying defined symbols representing nodes, identifying edges connecting the nodes, and extracting text from annotations at the nodes and edges. However, these techniques typically require manual intervention to identify erroneous aspects such as unrecognized or miscategorized symbols and edges, extraction errors and errors in the original drawing (e.g., incorrect connections and labels), and/or unrecognized or mistranslated annotations.

These errors can be caused by difficulty recognizing differences in orientation, scale, unusual or inconsistent symbols and/or other features (e.g., color coding, shape, subregions, etc.), unfamiliar text. Additional errors can be caused by a lack of domain information. Domain information can include information about materials' physical properties (e.g., durability, electrical conductivity, strength, etc.), interactions between entities (e.g., chemical reactivity, connectivity, direction, etc.), appropriate size and/or shape of components, etc. For example, in a circuit diagram an edge representing an electrical wire can have an annotation specifying the wire's material and gauge. However, another annotation can specify a current that is higher than the ampacity of the wire.

Disclosed herein are a method and system for extracting information from engineering drawings via machine learning techniques, such as region-based convolutional neural networks (R-CNNs). The disclosed approach identifies nodes, edges, and attributes thereof (e.g., based on annotations, color coding, shape, etc.). This approach can be scale- and rotation-invariant, and can detect errors based on information that includes domain information. Using these techniques, information can be extracted from engineering drawings with greater accuracy, completeness, and reliability.

Figure 1:
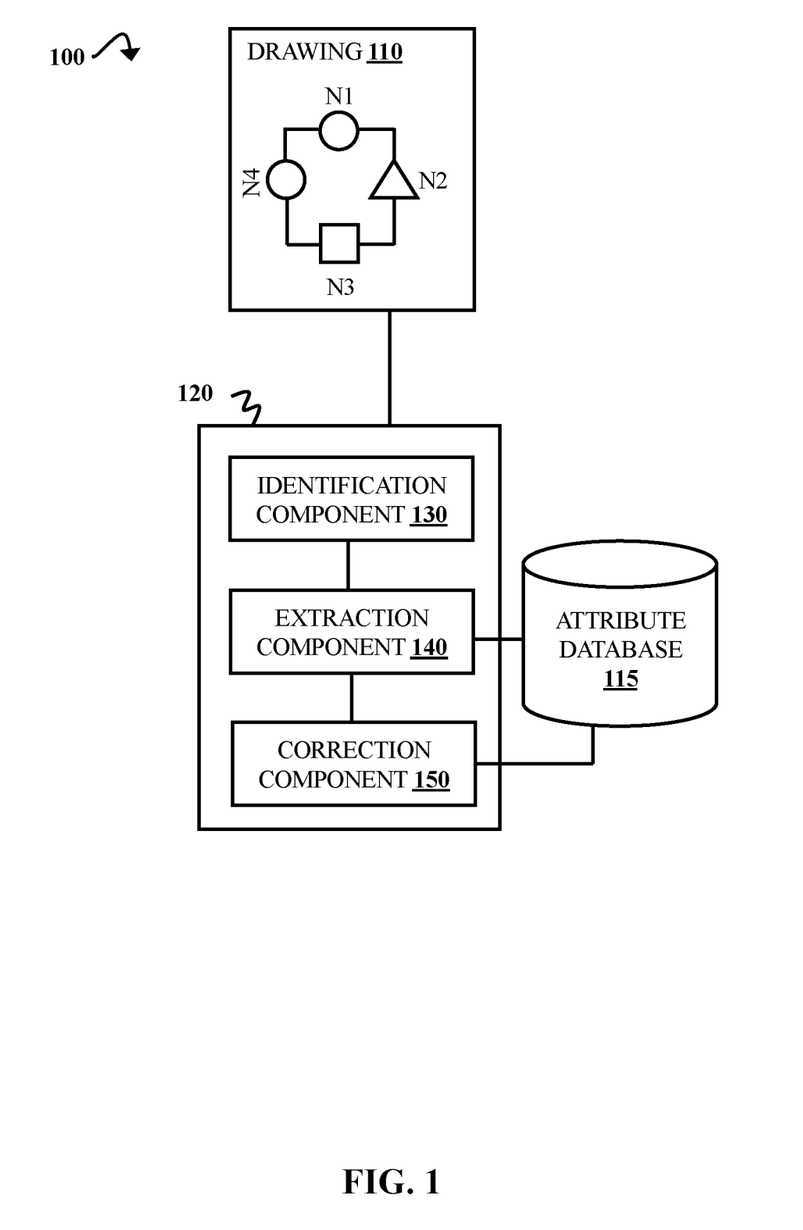
FIG. 1 is a block diagram illustrating an information extraction environment.

FIG. 1 is a block diagram illustrating an information extraction environment 100, according to some embodiments of the present disclosure. The information extraction environment 100 includes a drawing 110, an attribute database 115, and a drawing analysis module 120.

The illustrated drawing 110 is an engineering drawing. The drawing 110 can be in any computer-readable file format for text, vector graphics, and/or raster graphics. In some embodiments, the drawing 110 is prepared using a computer-aided design (CAD) application, an electronic design automation (EDA) application, a vector graphics application, or any other application for preparing technical drawings and/or diagrams. The drawing 110 can also be a digital image of a hard copy (e.g., a hand-drawn drawing, a drawing printed in a book, etc.).

In some embodiments, the drawing 110 is a technical drawing that includes nodes and edges, such as an engineering drawing. For example, the drawing 110 can be a PCB fabrication drawing, an architectural drawing; a mechanical, electrical, and plumbing (MEP) drawing; a structural drawing; a heating, ventilation, and air conditioning (HVAC) drawing; a site drawing; a construction plan; a power plant diagram; a logic diagram; a process flow diagram; an archaeological plan; a map or survey drawing (e.g., a cave survey, an astronomical survey, a mining survey, a hydrographic survey, a boundary survey, etc.); a sewing pattern; a blueprint; a wiring diagram, a circuit diagram, a landscape design drawing; etc. However, the drawing 110 can be any type of drawing that contains defined nodes and edges.

The drawing 110 includes at least two symbols (e.g., graphical symbols) representing nodes and at least one edge connecting the nodes. In FIG. 1, the drawing 110 is illustrated as having four nodes connected by edges. The nodes are represented by symbols: two circles with the annotations N1 and N4, a triangle with the annotation N2, and a square with the annotation N3. In some embodiments, the drawing 110 includes a key or legend (not shown) listing the symbols, edges, and their definitions. The position (e.g., distance from a node or edge), size, and/or orientation of the annotations and symbols can vary. For example, in FIG. 1 the annotation N4 is rotated 90° relative to N1, N2, and N3.

In some instances, the position/orientation of an annotation or symbol provides contextual information. For example, an arrow's meaning can depend on its direction. However, variations can also be caused by drafting preferences or spatial considerations. For example, an edge annotation indicating a distance between nodes (e.g., 4 meters) can be rotated 90° relative to other edge distance annotations in order to make the annotation fit into a crowded area of the drawing 110. Variations in position, size, orientation, etc. are discussed in greater detail below.

The attribute database 115 stores definitions of symbol, line, and/or annotation attributes. The attributes can be common or standard attributes (e.g., standard graphical symbols, color codes, terminology, units of measurement, etc.) associated with various types of technical drawings. For example, the attribute database 115 can store one or more sets of standards published by the Institute of Printed Circuits (IPC), International Organization for Standardization (ISO), the International Electrotechnical Commission (IEC), the American Wire Gauge (AWG), the American Society of Mechanical Engineers (ASME), etc. A set of organization-specific attributes (e.g., terms and/or symbols frequently used in documents made by a particular company) can also be added to the attribute database 115.

The attribute database 115 can also include domain information such as facts, regulations, and/or other information related to one or more domains. A domain is a particular topic, sentiment, or field (e.g., physics, electrical engineering, architecture, etc.). The level of specificity and number of domains can vary. Domain information can be used by the correction component 150 to correct aspects of the drawing 110. Domain information and corrections are discussed in greater detail below.

Further, the attribute database 115 can have at least one language model trained on commonly used semantic elements (e.g., symbols, characters, words, phrases, etc.) in one or more fields related to the drawing 110. For example, wiring diagrams for buildings can use language models trained on semantic elements used in electrical engineering and building construction. This can facilitate translation of annotations that use terms of art, refer to specialized equipment, or have other variations from standard language models. Language models for different geographical regions can be used to account for regional differences in symbols, words, units of measurement, regulations, etc. Additionally, machine learning approaches can be used to augment the language models. Examples of machine learning approaches that can be used can include convolutional neural networks (CNNs), feed-forward neural networks (FFNNs), recurrent neural networks (RNNs), etc.

The drawing analysis module 120 includes an identification component 130, an extraction component 140, and a correction component 150. In embodiments, the identification component 130, extraction component 140, and correction component 150 are processor executable instructions that can be executed by a dedicated or shared processor using received inputs.

The identification component 130 classifies regions of the drawing 110 into node types using image segmentation. Regions other than node types can also be identified 130, such as titles, page numbers, keys/legends, tables, descriptive text, etc. The segmentation can be carried out via R-CNNs, such as Faster R-CNN or Mask R-CNN, though other trainable segmentation techniques can be used (e.g., pulse-coupled neural networks (PCNNs) or U-Net). In some embodiments, region classification is made rotation- and scale-invariant using data augmentation during training (e.g., training on a CAD database). However, any techniques for rotation- and/or scale-invariant classification can be used (e.g., scale-invariant feature transform (SIFT)).

The identification component 130 removes the identified regions from the drawing 110, and identifies edges in the remaining image. Edge identification can be carried out using operators such as canny edge detectors. Other edge detection operators that can be used can include the Sobel operator, Robert's cross operator, Prewitt's operator, Laplacian of Gaussian (LoG), etc. From the detected edges, the identification component 130 determines the path of the edges via reinforcement learning (e.g., Q-learning). The identification component 130 further determines the connections between the identified edges and nodes based on proximity.

The extraction component 140 extracts attributes from the identified nodes and edges in the form of a multi-level graph. The attributes can include any information extracted from the drawing 110 that is related to the nodes ("node attributes") or edges ("edge attributes"). For example, attributes can be text annotations, domain information, visual features (e.g., color, shape, size, etc.), position, etc. Various information extraction techniques can be used to extract these attributes.

For example, the extraction component 140 can extract text from identified regions ("node annotations"), as well as text along the orientation of edges ("edge annotations"). The text can include labels, values, reference numbers, etc. Text features can be obtained via natural language processing, though any appropriate information extraction techniques can be used (e.g., coreference resolution, relationship extraction, named entity recognition, semi-structured information extraction, terminology extraction, etc.). The extraction component 140 can also extract features from text obtained by converting characters to machine-encoded text using techniques such as optical character recognition (OCR) or intelligent character recognition (ICR).

In an example where the drawing 110 is a wiring diagram, the extraction component 140 can extract a node annotation such as "voltage source". In some embodiments, the node has been classified as a voltage source based on its symbol, and can have an annotation indicating a voltage value (e.g., 10 V). An example of a wiring diagram edge annotation can be a color name abbreviation such as "GRN" for green. The edge can also be colored green with or without the annotation. Based on the extracted information indicating that the wire is green and standard color coding information in the attribute database 115, the extraction component 140 can determine that the edge represents a ground wire.

Additional attributes that can be extracted include types of edges (e.g., structural features, electrical connections, distance measurements, etc.). This can be determined based on the types of nodes at edges' endpoints (e.g., arrowheads, batteries, voltage or current sources, PCB components, etc.) and/or edge annotations, such as labels or units of measurement. Edge types can also be determined from attributes such as line appearance (e.g., colored, dashed, solid, dotted, etc.).

However, any available attributes can be extracted by the extraction component 140 in some embodiments. For example, geographic information system (GIS) data can be extracted from drawings such as civil engineering drawings or maps in some embodiments. The attributes can also be based on domain information regarding physical properties of various materials and components illustrated in the drawing 110. For example, the drawing 110 can illustrate a layout of a chemical storage facility, and the extraction component 140 can extract annotations that name chemical entities at nodes classified as storage vessels (e.g., barrels, bottles, etc.).

It should be noted that, while the examples illustrated herein refer to node attributes and edge attributes, attributes from regions other than nodes (e.g., descriptive text (not shown) in the margin of the drawing 110) can be extracted in some embodiments. Further, edge and node attributes can be extracted from a key or legend. For example, a key (not shown) included in the drawing 110 can indicate that circles represent resistors and that annotations "N1" and "N4" refer to specific resistors (e.g., N1=resistor A and N4=resistor B). The extraction component 140 can extract these attributes from the key and nodes in order to identify the circle nodes (e.g., as resistors A and B). The extracted information can be saved in the attribute database 115.

The correction component 150 evaluates the extracted information, and determines whether there are aspects of the information that may be incorrect or otherwise inconsistent with information in the attribute database 115. The correction component 150 makes this determination based on comparisons between extracted information and information in the attribute database 115. For example, the drawing 110 can include a diagram of a short circuit (not shown), and the extraction component 140 can indicate that a node identified as a voltage source for the circuit is annotated with the value 10 V across the short circuit.

In another circuit diagram example, the drawing 110 can be a circuit diagram that includes nodes identified as resistors. The extraction component 140 can identify a node annotation next to a resistor node as being "10". However, the correction component 150 can determine, based on information in the attribute database 115 (e.g., domain information, language models, published standards, etc.), that resistors should be annotated with resistance values measured in ohms ($\Omega$). The correction component 150 can then change the annotation to "10$\Omega$", and/or flag the error.

The attribute database 115 can include domain information (e.g., for circuit design, electrical engineering, and/or physics) specifying that a voltage cannot develop over a short circuit. Based on this information, the correction component 150 can correct (e.g., by connecting the edge or annotation to a different node) and/or flag the error (e.g., by generating a notification, inserting an additional annotation, changing the color of the annotation, etc.), which can then be evaluated by a user.

The correction component 150 can also use domain information concerning safety and/or quality standards. For example, the drawing 110 can include plans for a building intended to comply with the U.S. National Electrical Code (NEC), which provides standards for the installation of electrical wiring and equipment (e.g., distances between electrical outlets). Information from the NEC can be stored in the attribute database 115, and aspects of a drawing that do not comply with these standards can be flagged. Further, referring to the chemical storage facility example discussed above, the correction component 150 can locate aspects of the drawing 110 layout that may be unsafe based on properties of the identified chemical entities. For example, the attribute database 115 can indicate that acetone should not be stored in the same area as halogens. In additional examples, the attribute database 115 can contain information used in detecting possible structural flaws in drawings of buildings, bridges, or various mechanical objects.

In some embodiments, environment 100 can include a user interface (not shown) that can display information extracted from one or more drawings. The user interface can optionally include a search feature that allows users to search based on parameters such as type of drawing, type of annotation, etc. The interface can also display drawing 110 features identified as possible errors by the correction module 150, as well as one or more options for correcting the errors.

Figure 2:
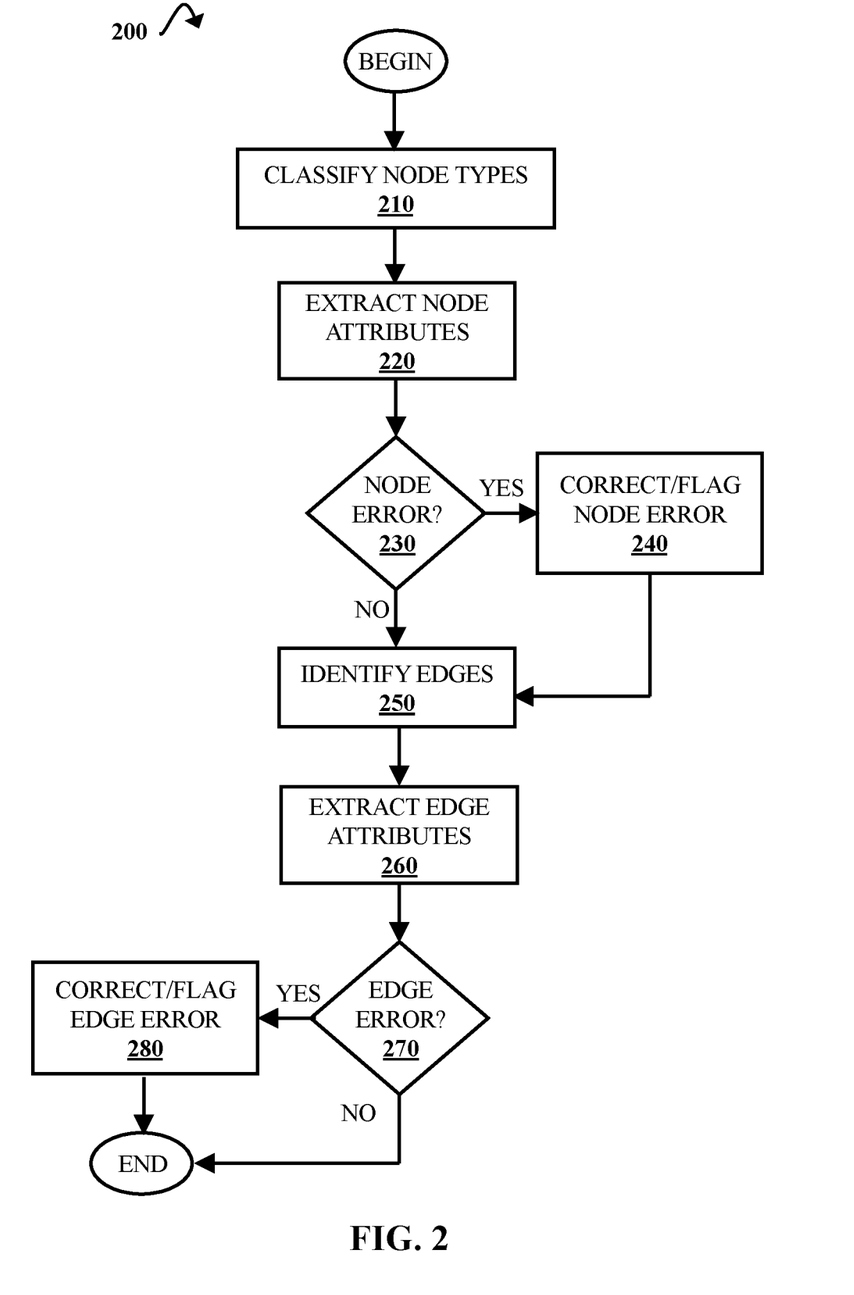
FIG. 2 is a flow diagram illustrating a process of extracting information from a drawing.

FIG. 2 is a flow diagram illustrating a process 200 of extracting information from a drawing, according to some embodiments of the present disclosure. To illustrate process 200, but not to limit embodiments, FIG. 2 is described within the context of the information extraction environment 100 of FIG. 1. Where elements shown in FIG. 2 are identical to elements shown in FIG. 1, the same reference numbers are used in both Figures.

Regions in a drawing 110 are classified into node types. This is illustrated at step 210. In some embodiments, regions other than nodes are identified as well, such as titles, tables, keys/legends, etc. The regions are identified by the identification component 130 via image segmentation techniques such as R-CNNs. The region classification can be made scale- and/or rotation-invariant (e.g., by data augmentation). The initial node classification is carried out at a first zoom level (i=0), which can be a full image of the drawing 110. The identification component 130 can also identify sub-regions within each identified region at one or more zoom levels i+1. For example, nodes classified as battery symbols can have sub-regions with symbols for positive and negative charges.

Node attributes are then extracted from the identified regions of the drawing 110. This is illustrated at step 220. Node attributes can include node annotations, which include text (e.g., words, numbers, letters, and other characters) extracted from the identified regions. For example, a node representing a via on a PCB fabrication drawing can have a diameter measurement annotation (e.g., 0.6 mm). Node attributes can also include colors (e.g., for color-coded drawings), graphical features (e.g., nodes representing lamps can be shaped like lightbulbs), position/orientation within the drawing, GIS data, physical and/or chemical properties of elements represented by the nodes, etc.

It is then determined whether there is at least one error in the extracted node and/or attributes. This is illustrated at step 230. The correction component 150 makes this determination based on comparisons between extracted information and information in the attribute database 115. For example, the correction component 150 can determine whether node attributes comply with domain information, language models, published standards, etc. For example, the drawing can have circular nodes representing current sources, and one of the circular nodes can be annotated with a value measured in ohms ($\Omega$). The correction component 150 can then determine that this is an error because current values are measured in amperes (A), while resistance values are measured in ohms. The correction component 150 can also determine whether node attributes are consistent within the drawing 110. For example, if triangular nodes represent batteries, and all but one of the triangular nodes includes an annotation such as "battery 1", "battery 2", "battery 3", etc., the correction component 150 can identify the inconsistent triangular node.

If at least one node error is identified, the error(s) are corrected and/or flagged. This is illustrated at step 240. The correction can include changing a node's annotation or other attribute, changing a node's classification, removing or repositioning a node, etc. Referring again to the example in which the circular nodes are current sources, the unit symbol can be changed from $\Omega$ to A.

However, other corrections can be made. For example, there can be a resistor node with no corresponding resistance value annotation positioned near the identified circular node. There can also be a nearby current value annotation without a corresponding node. The correction component 150 can therefore reassign the resistance value to the resistor node, and assign the current value to the circular node. The corrected error can optionally be flagged. In some embodiments, the potential error can be flagged without making any corrections. A user can evaluate flagged errors and/or corrections, and determine whether to implement corrections generated by the correction component 150, implement alternative corrections, indicate that no change should be made, or take no action.

When errors have been corrected at step 240, or when no error is found at step 230, edges are identified in the drawing 110. This is illustrated at step 250. The identification component 130 removes regions identified at step 210 from the drawing 110, leaving the edges in place. The identification component 130 then locates edges in the drawing 110 using edge detection operators (e.g., canny edge detectors), and identifies the path of the edges using reinforcement learning techniques (e.g., path finding/maze solving techniques, such as Q-learning).

Attributes are then extracted from the identified edges. This is illustrated at step 260. The edge attributes can include edge annotations, colors and other visual features, endpoint node types, etc. For example, an edge on a PCB drawing can be a conductor strip with edge annotations indicating a current value, material (e.g., copper), and/or distance measurement. The extraction component 140 uses techniques for extracting edge attributes that are substantially similar to the techniques for extracting node attributes at step 220. These are discussed in greater detail with respect to step 220 and FIG. 1.

It is then determined whether there are errors in the edge attributes and/or connections. This is illustrated at step 270. For example, an edge can be identified as an electrical cable, and the extraction component 140 can extract an edge annotation, "19 E". However, the correction component 150 can determine that this may be an error because the unit E is not defined in the attribute database 115. The correction component 150 determines whether there are edge errors using techniques substantially similar to the techniques for locating node errors at step 230. These techniques are discussed in greater detail with respect to step 230 and FIG. 1.

If one or more edge errors are detected at step 270, the correction component 150 corrects and/or flags the error(s). This is illustrated at step 280. Referring again to the example illustrated at step 270, the correction component 150 can determine that the electrical cable edges should be annotated with dimensions measured in feet, which a language model in the attribute database 115 abbreviates as "F". Therefore, the correction component 150 can edit the annotation to be "19 F" rather than "19E". The correction component 150 corrects and/or flags edge errors using techniques substantially similar to the techniques for correcting/flagging node errors at step 240. These techniques are discussed in greater detail with respect to step 240 and FIG. 1.

When any errors have been corrected at step 280, or when no error is found at step 270, process 200 can end. In some embodiments, extracted attributes, error flag notifications, or other information from the drawing 110 can be provided to users via a user interface. This is discussed in greater detail with respect to FIG. 1. The extracted information can also be stored in the attribute database 115.

Figure 3:
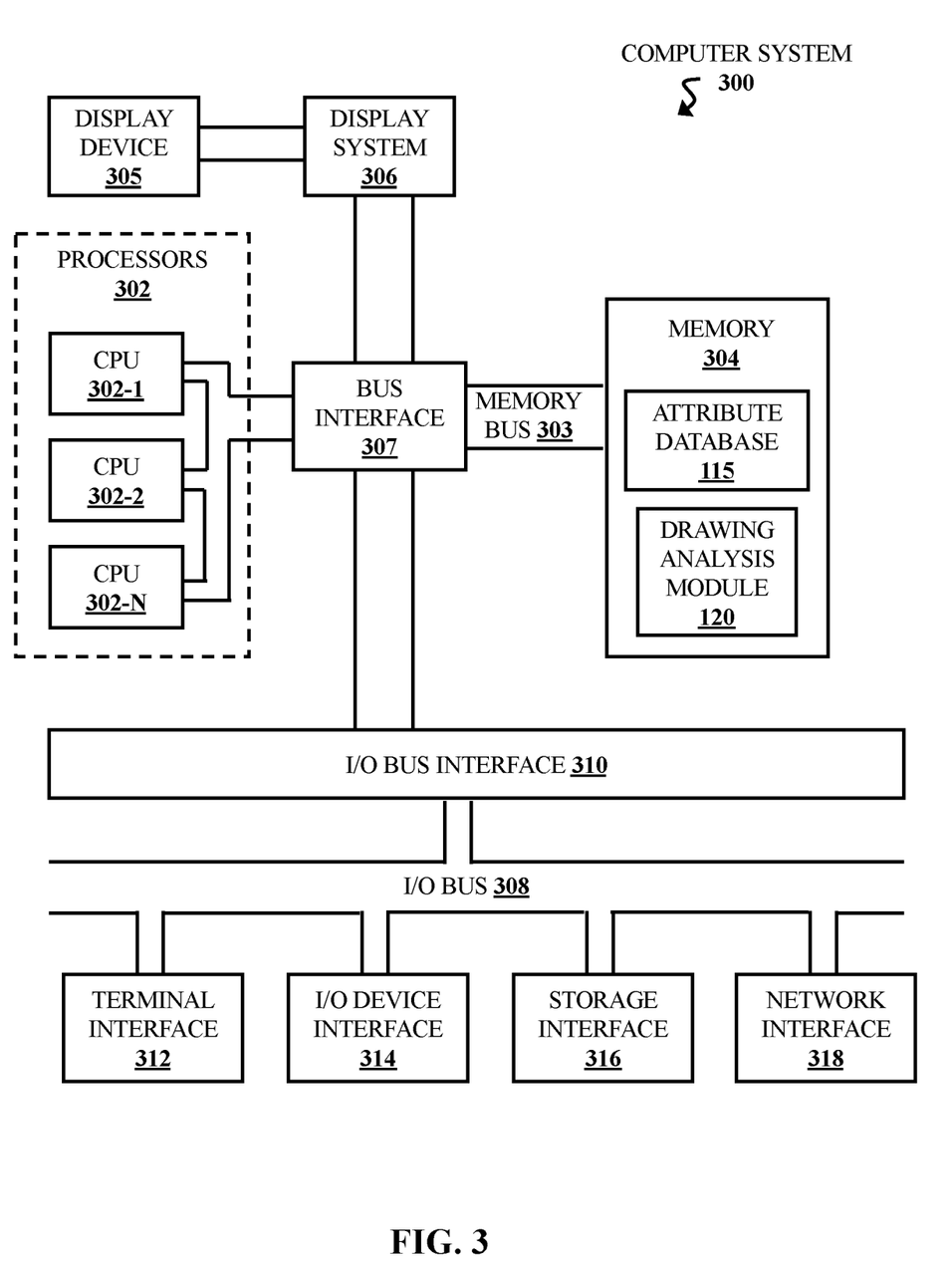
FIG. 3 is a block diagram illustrating a computer system, according to some embodiments of the present disclosure.

FIG. 3 is a block diagram illustrating an exemplary computer system 300 that can be used in implementing one or more of the methods, tools, components, and any related functions described herein (e.g., using one or more processor circuits or computer processors of the computer). In some embodiments, the major components of the computer system 300 comprise one or more processors 302, a memory subsystem 304, a terminal interface 312, a storage interface 316, an input/output device interface 314, and a network interface 318, all of which can be communicatively coupled, directly or indirectly, for inter-component communication via a memory bus 303, an input/output bus 308, bus interface unit 307, and an input/output bus interface unit 310.

The computer system 300 contains one or more general-purpose programmable central processing units (CPUs) 302-1, 302-2, and 302-N, herein collectively referred to as the CPU 302. In some embodiments, the computer system 300 contains multiple processors typical of a relatively large system; however, in other embodiments the computer system 300 can alternatively be a single CPU system. Each CPU 302 may execute instructions stored in the memory subsystem 310 and can include one or more levels of on-board cache.

The memory 304 can include a random-access semiconductor memory, storage device, or storage medium (either volatile or non-volatile) for storing or encoding data and programs. In some embodiments, the memory 304 represents the entire virtual memory of the computer system 300, and may also include the virtual memory of other computer systems coupled to the computer system 300 or connected via a network. The memory 304 is conceptually a single monolithic entity, but in other embodiments the memory 304 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory can be further distributed and associated with different CPUs or sets of CPUs, as is known in any of various so-called non-uniform memory access (NUMA) computer architectures. The memory 304 also contains an attribute database 115 and a drawing analysis module 120 (illustrated in FIG. 1).

These components are illustrated as being included within the memory 304 in the computer system 300. However, in other embodiments, some or all of these components may be on different computer systems and may be accessed remotely, e.g., via a network. The computer system 300 may use virtual addressing mechanisms that allow the programs of the computer system 300 to behave as if they only have access to a large, single storage entity instead of access to multiple, smaller storage entities. Thus, though the attribute database 115 and the drawing analysis module 120 are illustrated as being included within the memory 304, components of the memory 304 are not necessarily all completely contained in the same storage device at the same time. Further, although these components are illustrated as being separate entities, in other embodiments some of these components, portions of some of these components, or all of these components may be packaged together.

In an embodiment, the drawing analysis module 120 includes instructions that execute on the processor 302 or instructions that are interpreted by instructions that execute on the processor 302 to carry out the functions as further described in this disclosure. In another embodiment, the drawing analysis module 120 is implemented in hardware via semiconductor devices, chips, logical gates, circuits, circuit cards, and/or other physical hardware devices in lieu of, or in addition to, a processor-based system. In another embodiment, the drawing analysis module 120 includes data in addition to instructions.

Although the memory bus 303 is shown in FIG. 3 as a single bus structure providing a direct communication path among the CPUs 302, the memory subsystem 310, the display system 306, the bus interface 307, and the input/output bus interface 310, the memory bus 303 can, in some embodiments, include multiple different buses or communication paths, which may be arranged in any of various forms, such as point-to-point edges in hierarchical, star or web configurations, multiple hierarchical buses, parallel and redundant paths, or any other appropriate type of configuration. Furthermore, while the input/output bus interface 310 and the input/output bus 308 are shown as single respective units, the computer system 300 may, in some embodiments, contain multiple input/output bus interface units 310, multiple input/output buses 308, or both. Further, while multiple input/output interface units are shown, which separate the input/output bus 308 from various communications paths running to the various input/output devices, in other embodiments some or all of the input/output devices may be connected directly to one or more system input/output buses.

The computer system 300 may include a bus interface unit 307 to handle communications among the processor 302, the memory 304, a display system 306, and the input/output bus interface unit 310. The input/output bus interface unit 310 may be coupled with the input/output bus 308 for transferring data to and from the various input/output units. The input/output bus interface unit 310 communicates with multiple input/output interface units 312, 314, 316, and 318, which are also known as input/output processors (IOPs) or input/output adapters (IOAs), through the input/output bus 308. The display system 306 may include a display controller. The display controller may provide visual, audio, or both types of data to a display device 305. The display system 306 may be coupled with a display device 305, such as a standalone display screen, computer monitor, television, or a tablet or handheld device display. In alternate embodiments, one or more of the functions provided by the display system 306 may be on board a processor 302 integrated circuit. In addition, one or more of the functions provided by the bus interface unit 307 may be on board a processor 302 integrated circuit.

In some embodiments, the computer system 300 is a multi-user mainframe computer system, a single-user system, or a server computer or similar device that has little or no direct user interface, but receives requests from other computer systems (clients). Further, in some embodiments, the computer system 300 is implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 300. In some embodiments, however, individual components may have greater or lesser complexity than as represented in FIG. 3, Components other than or in addition to those shown in FIG. 3 may be present, and the number, type, and configuration of such components may vary.

In some embodiments, the data storage and retrieval processes described herein could be implemented in a cloud computing environment, which is described below with respect to FIGS. 4 and 5. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
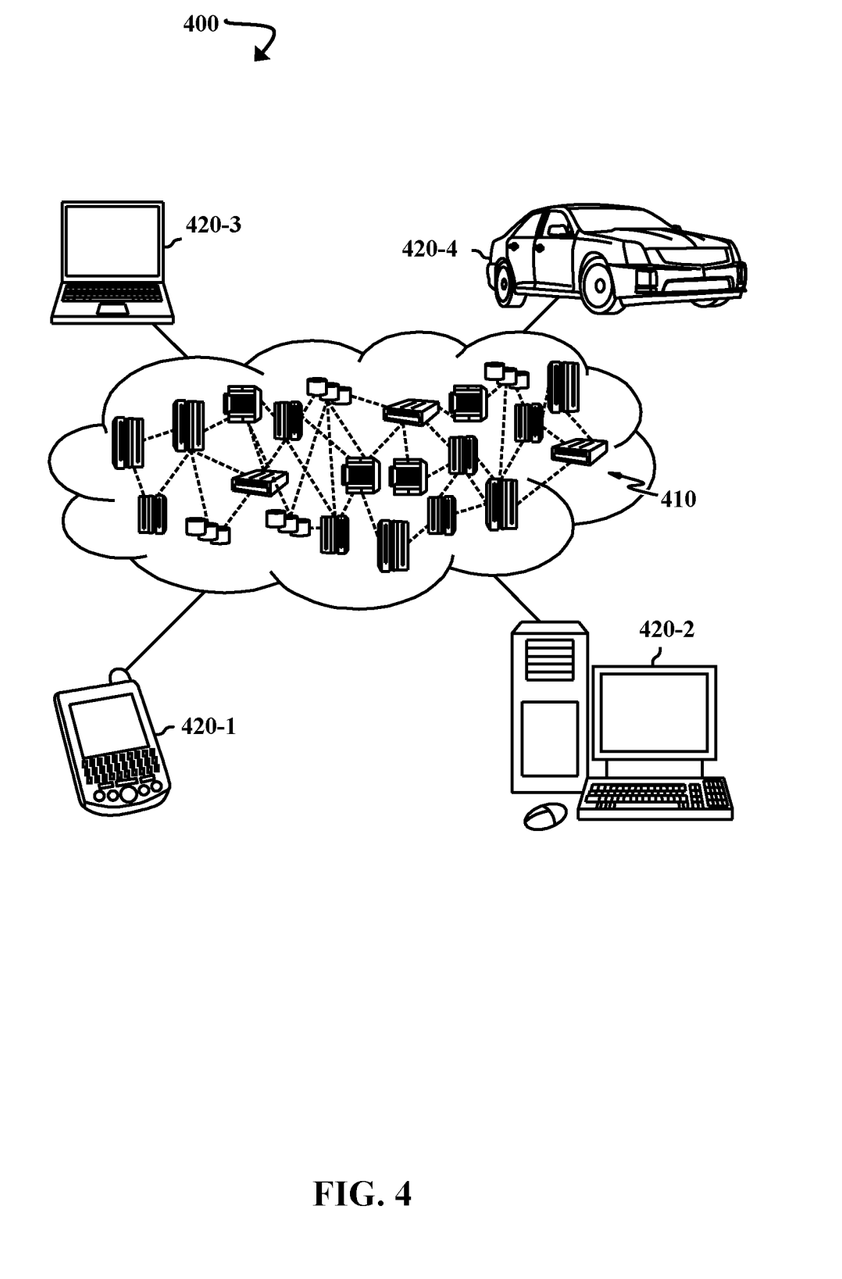
FIG. 4 is a block diagram illustrating a cloud computing environment, according to some embodiments of the present disclosure.

FIG. 4 is a block diagram illustrating a cloud computing environment 400, according to some embodiments of the present disclosure. As shown, cloud computing environment 400 includes one or more cloud computing nodes 410 with which local computing devices used by cloud consumers, such as, for example, personal digital assistant (PDA) or cellular telephone 420-1, desktop computer 420-2, laptop computer 420-3, and/or automobile computer system 420-4 may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 420-1-420-4 shown in FIG. 4 are intended to be illustrative only and that computing nodes 410 and cloud computing environment 400 can communicate with any type of computerized device over any type of network and/or network addressable connection (e.g., using a web browser).

Figure 5:
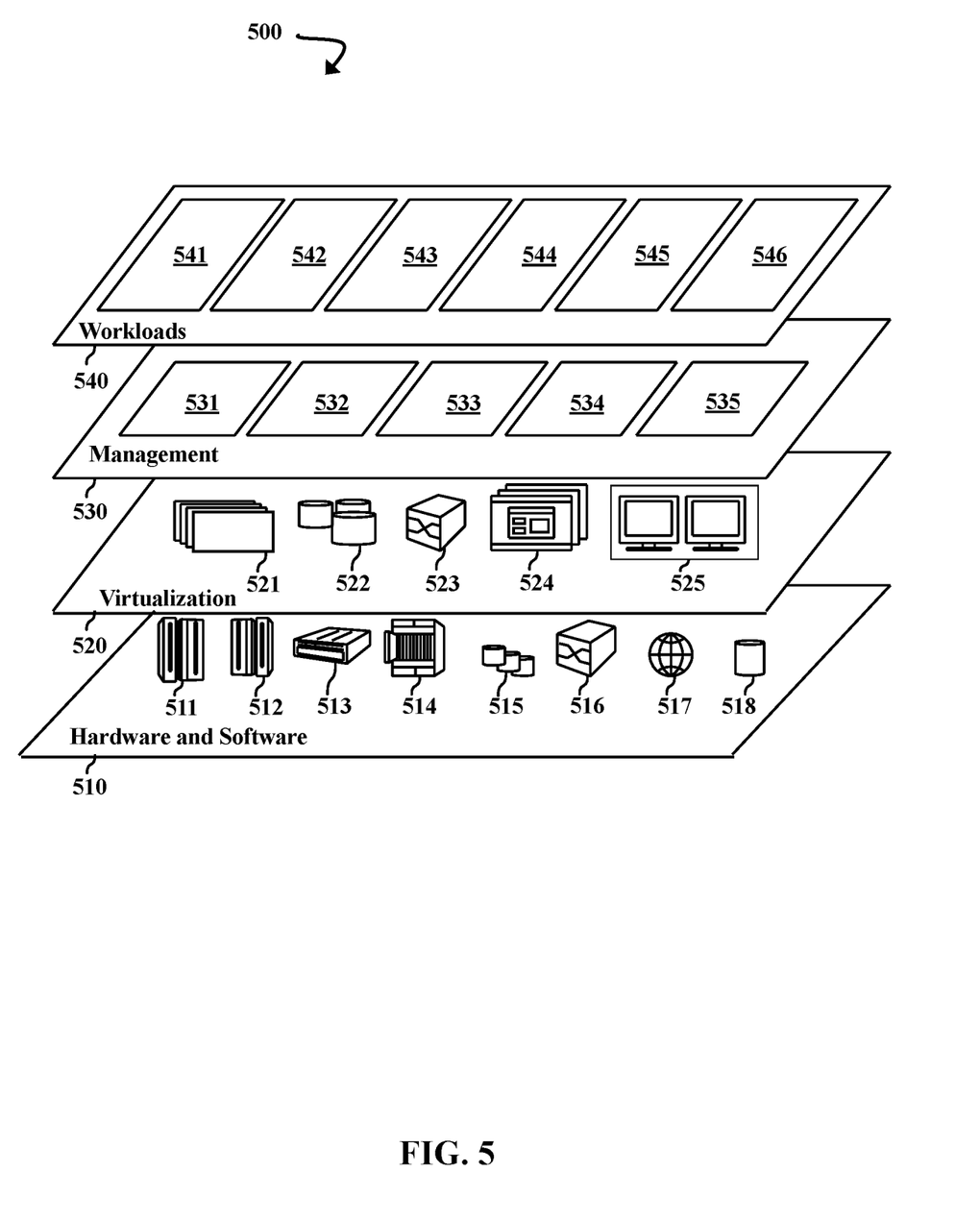
FIG. 5 is a block diagram illustrating a set of functional abstraction model layers provided by the cloud computing environment, according to some embodiments of the present disclosure.

FIG. 5 is a block diagram illustrating a set of functional abstraction model layers 500 provided by the cloud computing environment 400, according to some embodiments of the present disclosure. It should be understood in advance that the components, layers, and functions shown in FIG. 5 are intended to be illustrative only and embodiments of the invention are not limited thereto. As depicted, the following layers and corresponding functions are provided:

Hardware and software layer 510 includes hardware and software components. Examples of hardware components include: mainframes 511; RISC (Reduced Instruction Set Computer) architecture-based servers 512; servers 513; blade servers 514; storage devices 515; and networks and networking components 516. In some embodiments, software components include network application server software 517 and database software 518.

Virtualization layer 520 provides an abstraction layer from which the following examples of virtual entities may be provided: virtual servers 521; virtual storage 522; virtual networks 523, including virtual private networks; virtual applications and operating systems 524; and virtual clients 525.

In one example, management layer 530 provides the functions described below. Resource provisioning 531 provides dynamic procurement of computing resources and other resources that are utilized to perform tasks within the cloud computing environment. Metering and Pricing 532 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 533 provides access to the cloud computing environment for consumers and system administrators. Service level management 534 provides cloud computing resource allocation and management such that required service levels are met. Service Level Agreement (SLA) planning and fulfillment 535 provide pre-arrangement for, and procurement of, cloud computing resources for which a future requirement is anticipated in accordance with an SLA.

Workloads layer 540 provides examples of functionality for which the cloud computing environment can be utilized. Examples of workloads and functions that can be provided from this layer include: mapping and navigation 541; software development and lifecycle management 542; virtual classroom education delivery 543; data analytics processing 544; transaction processing 545; and extracting information from technical drawings 546.

The present disclosure may be a system, a method, and/or a computer program product. The computer program product may include a computer readable storage medium (or media) having computer readable program instructions thereon for causing a processor to carry out aspects of the present disclosure.

The computer readable storage medium is a tangible device that can retain and store instructions for use by an instruction execution device. Examples of computer readable storage media can include an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a component, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the present disclosure.

What is claimed is:

1. A system, comprising:
   a memory; and
   a processor communicatively coupled to the memory, wherein the processor is configured to:
   identify, in a drawing, regions that contain nodes;
   classify the identified regions based on the nodes;
   extract node attributes from the identified regions;
   determine whether there are errors in the extracted node attributes;
   when the determination is complete, remove the node attributes and the nodes from the drawing;
   when the node attributes and the nodes have been removed from the drawing, identify edges in the drawing;
   extract edge attributes from the edges; and
   determine whether there are errors in the extracted edge attributes.

2. The system of claim 1, further comprising an attribute database.

3. The system of claim 2, wherein the attribute database includes definitions of node symbols.

4. The system of claim 2, wherein the attribute database includes domain information.

5. The system of claim 1, wherein the extracted node attributes and edge attributes comprise text annotations.

6. The system of claim 1, wherein the classification uses a region-based convolutional neural network (R-CNN).

7. The system of claim 6, wherein the classification is rotation-invariant.

8. The system of claim 6, wherein the classification is scale-invariant.

9. A method, comprising:
   identifying, in a drawing, regions that contain nodes;
   classifying the identified regions based on the nodes;
   extracting node attributes from the identified regions;
   determining whether there are errors in the node attributes;
   when the determination is complete, removing the node attributes and the nodes from the drawing;
   when the node attributes and the nodes have been removed from the drawing, identifying edges in the drawing;
   extracting edge attributes from the edges; and
   determining whether there are errors in the edge attributes.

10. The method of claim 9, wherein the classifying uses a region-based convolutional neural network (R-CNN).

11. The method of claim 9, wherein the identifying the edges comprises carrying out an edge detection operator and a reinforcement learning technique.

12. The method of claim 9, wherein the classifying is scale-invariant.

13. The method of claim 9, wherein the extracting the node attributes and the edge attributes comprises comparing the node attributes and the edge attributes to information in an attribute database.

14. The method of claim 13, wherein the attribute database includes data from a set of published standards.

15. The method of claim 9, wherein the determining whether there are errors in the node attributes and the edge attributes is based on domain information.

16. A computer program product for extracting information from a drawing, the computer program product comprising a computer readable storage medium having program instructions embodied therewith, the program instructions executable by a processor to cause the processor to perform a method, the method comprising:
   identifying, in the drawing, regions that contain nodes;
   classifying the identified regions based on the nodes;
   extracting node attributes from the identified regions;
   determining whether there are errors in the node attributes;
   when the determination is complete, removing the node attributes and the nodes from the drawing;
   when the node attributes and the nodes have been removed from the drawing, identifying edges in the drawing;
   extracting edge attributes from the edges; and
   determining whether there are errors in the edge attributes.

17. The computer program product of claim 16, wherein the classifying uses a region-based convolutional neural network (R-CNN).

18. The computer program product of claim 16, wherein the identifying the edges comprises carrying out an edge detection operator and a reinforcement learning technique.

19. The computer program product of claim 16, wherein the determining whether there are errors in the node attributes and the edge attributes is based on domain information.

20. The computer program product of claim 19, wherein the domain information is stored in an attribute database.

* * * * *